(12) United States Patent
Ross

(10) Patent No.: US 10,475,323 B1
(45) Date of Patent: Nov. 12, 2019

(54) NETWORK HUB FOR AN ALERT REPORTING SYSTEM

(71) Applicant: MedHab, LLC, Mansfield, TX (US)

(72) Inventor: Johnny Ross, Mansfield, TX (US)

(73) Assignee: MedHab, LLC, Mansfield, TX (US)

( * ) Notice: Subject to any disclaimer, the term of this patent is extended or adjusted under 35 U.S.C. 154(b) by 0 days.

(21) Appl. No.: 16/243,390

(22) Filed: Jan. 9, 2019

(51) Int. Cl.
| | |
|---|---|
| G08B 17/10 | (2006.01) |
| G08B 21/18 | (2006.01) |
| H04W 76/14 | (2018.01) |
| G08B 21/02 | (2006.01) |
| H04W 4/14 | (2009.01) |
| H04W 4/90 | (2018.01) |

(52) U.S. Cl.
CPC .......... *G08B 21/182* (2013.01); *G08B 21/02* (2013.01); *H04W 4/14* (2013.01); *H04W 76/14* (2018.02); *H04W 4/90* (2018.02)

(58) Field of Classification Search
CPC .... G08B 21/182; G08B 17/10; G08B 25/002; G08B 21/02; H04W 76/14; H04W 24/10; H04W 4/14; H04W 4/90
See application file for complete search history.

(56) References Cited

U.S. PATENT DOCUMENTS

| | | | | |
|---|---|---|---|---|
| 8,350,694 B1 * | 1/2013 | Trundle | ................. | G08B 25/08 340/539.11 |
| 9,110,848 B1 * | 8/2015 | Kim | ................... | G06F 11/0709 |
| 9,600,994 B2 | 3/2017 | Park | | |
| 9,691,253 B2 | 6/2017 | Russell | | |
| 2006/0072317 A1 * | 4/2006 | Noordhoek | ............... | F21K 9/00 362/231 |
| 2010/0048134 A1 * | 2/2010 | McCarthy | ............ | H04R 1/1041 455/41.3 |
| 2011/0177790 A1 * | 7/2011 | Monte | ................. | G08B 21/0269 455/404.2 |
| 2012/0112903 A1 * | 5/2012 | Kaib | .................... | A61N 1/3993 340/539.12 |
| 2013/0300356 A1 * | 11/2013 | Yang | ..................... | H02J 7/0047 320/108 |
| 2014/0378786 A1 | 12/2014 | Hong | | |
| 2015/0022368 A1 * | 1/2015 | Smith | ....................... | G05F 1/46 340/693.3 |
| 2015/0323974 A1 * | 11/2015 | Shuster | ............ | H04M 1/72563 713/320 |

(Continued)

*Primary Examiner* — An T Nguyen
(74) *Attorney, Agent, or Firm* — Eric Karich; Karich & Associates

(57) ABSTRACT

A network hub has a housing that contains a computer processor and a computer memory operably connected to a transceiver for communicating with a plurality of alert devices. The network hub also includes a speaker operably connected to the computer processor. The computer memory stores executable code that, when executed, enables the network hub to perform a process that includes the steps of: pairing one of the alert devices with the network hub via the transceiver for wireless communication; receiving data periodically from the alert device paired with the network hub, which may include the alert if the user requires assistance; determining if the alert device loses wireless communication with the network hub; and sounding an audible alert from the speaker of the network hub to alert the user that the alert device has lost communication with the network hub.

9 Claims, 3 Drawing Sheets

(56) References Cited

U.S. PATENT DOCUMENTS

2017/0079257 A1* 3/2017 Haensgen ............. H04W 76/14
2017/0156076 A1* 6/2017 Eom ....................... H04W 4/70
2018/0033275 A1* 2/2018 Ginsberg ............... G08B 17/10

* cited by examiner

NETWORK HUB FOR AN ALERT REPORTING SYSTEM

BACKGROUND OF THE INVENTION

Field of the Invention

This invention relates generally network hubs, and more particularly to a network hub for an alert reporting system.

Description of Related Art

Hong, U.S. 2014/0378786, teaches a biometric monitoring device ("BMD") that is adapted to be worn around the wrist (via a wrist-band), or arm (via an arm-band). The BMD functions in multiple device modes depending on operational conditions of the devices, e.g., motion intensity, device placement, and/or activity type. The device modes are associated with various data processing algorithms. In some embodiments, the BMD is implemented as a wrist-worn or arm-worn device. The BMD determines that the user is engaged in a particular activity type by detecting a signature signal selectively associated with the particular activity type, and quantifies a physiological metric for the particular activity type.

Park, U.S. Pat. No. 9,600,994, teaches a device that is similar to the device disclosed in Hong, but which also may alternatively be mounted in a belt-clip. The device includes one or more motion sensors for sensing motion of the device and providing activity data indicative of the sensed motion. The device also includes one or more processors for monitoring the activity data, and receiving or generating annotation data for annotating the activity data with one or more markers or indicators to define one or more characteristics of an activity session.

Russell, U.S. Pat. No. 9,691,253, teaches a remote physiological monitoring device for monitoring a patient that is at-risk for falling. The system tracks movement data of a patient from one or more sensors. The device may be attached to the user's wrist, arm, thigh, or elsewhere via an article of clothing. Once it is determined that the at-risk condition is satisfied, the methods may also include issuing an alert based, at least in part, on the determination that the at-risk condition is satisfied.

SUMMARY OF THE INVENTION

The present invention teaches certain benefits in construction and use which give rise to the objectives described below.

The present invention provides a network hub for communicating with an alert device of a user for receiving electronic alerts from the user. The network hub includes a housing that contains a computer processor and a computer memory operably connected to a transceiver for communicating with the plurality of alert devices. The network hub also includes a speaker operably connected to the computer processor. The computer memory stores executable code that, when executed, enables the network hub to perform a process that comprises the steps of: pairing one of the alert devices with the network hub via the transceiver for wireless communication; receiving data periodically from the alert device paired with the network hub, which may include the alert if the user requires assistance; determining if the alert device loses wireless communication with the network hub; and sounding an audible alert from the speaker of the network hub to alert the user that the alert device has lost communication with the network hub.

A primary objective of the present invention is to provide a network hub having advantages not taught by the prior art.

Another objective is to provide an alert system having advantages not taught by the prior art.

Another objective is to provide caregivers of the elderly or at-risk with additional tools to ensure safety.

A further objective is to provide an easy-to use mechanism for communications in a network, because the elderly or at-risk may have difficulty with many modern technological mechanisms.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a network hub for communicating with an alert device of a user for receiving electronic alerts from the user.

Figure 1:
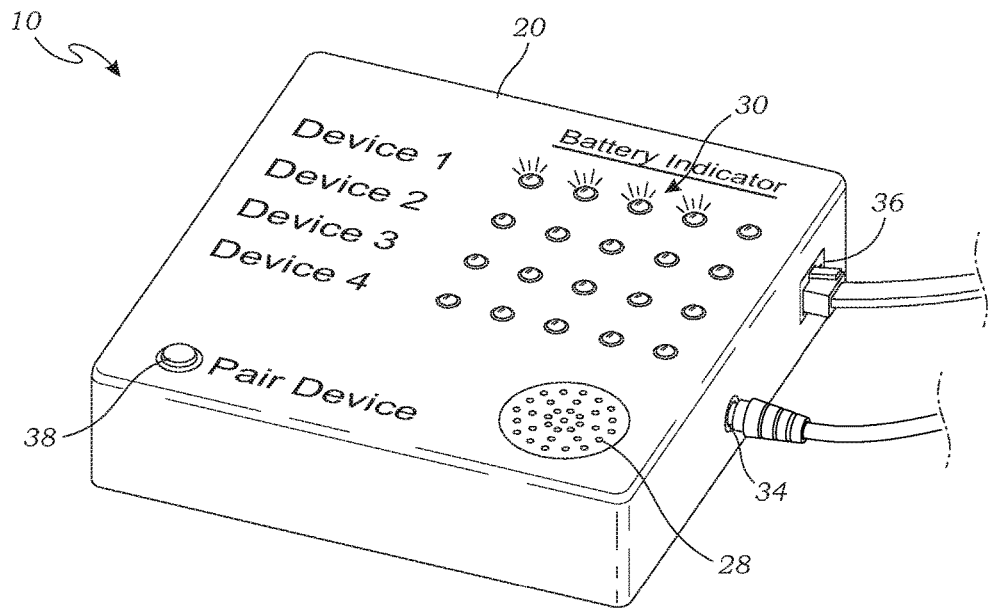
FIG. 1 is a perspective view of a network hub used in alert system, according to one embodiment of the present invention.
Figure 2:
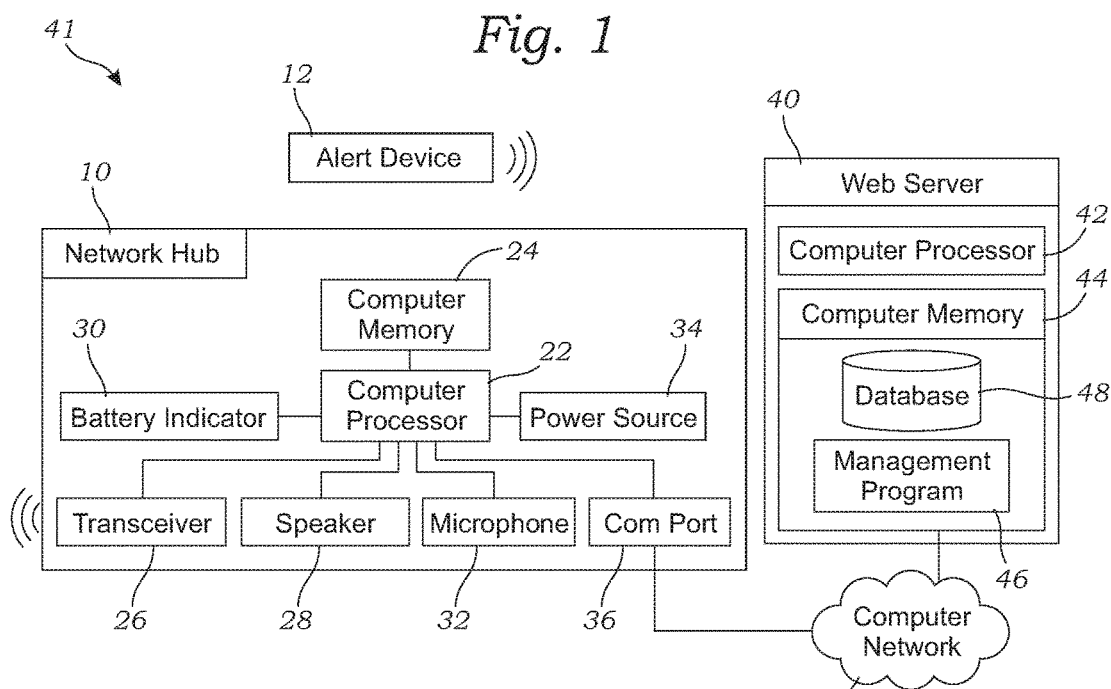
FIG. 2 is a block diagram of one embodiment of the network hub of FIG. 1.

FIG. 1 is a perspective view of a network hub 10 used in one embodiment of an alert system. FIG. 2 is a block diagram of one embodiment of the network hub 10 of FIG. 1, configured as part of an alert system 41. As shown in FIGS. 1-2, the network hub 10 includes a housing 20 that contains a computer processor 22 and a computer memory 24 operably connected to a transceiver 26 for communicating with the alert device 12 (shown in FIG. 3). The term "computer processor" as used herein refers to one or more of any form of computer processing chip, CPU, microprocessor, or equivalent device known in the art.

The term "computer memory" as used herein refers to any tangible, non-transitory storage that participates in providing instructions to a processor for execution. Such a medium may take many forms, including, but not limited to, non-volatile media, volatile media, and any equivalent media known in the art. Non-volatile media includes, for example, ROM, magnetic media, and optical storage media. Volatile media includes, for example, DRAM, which typically serves as main memory. Common forms of computer memory include, for example, hard drives and other forms of magnetic media, optical media such as CD-ROM disks, various forms of RAM, ROM, PRO M, EPROM, and FLASH-EPROM, as well as solid state media such as memory cards, and any other form of memory chip or cartridge, or any other medium from which a computer can read. While several examples are provided above, these examples are not meant to be limiting, but illustrative of several common examples, and any similar or equivalent devices or systems may be used that are known to those skilled in the art.

The term "transceiver" is hereby defined to include any form of device for transmitting and receiving electronic signals known in the art, or equivalent thereto, whether in a single circuit, or in more than one circuit or component. In some embodiments, multiple transceivers and other forms of electronic communications devices are included. In one embodiment, the wireless transmissions are made using short range signals, such as BLUETOOTH®. In another embodiment, the transmissions are made using sub-gigahertz radio frequency bands (e.g., 868 MHz, 915 MHz), which enable long range transmissions, which are defined to be about 10 km in rural areas. In alternative embodiments, the transceiver 26 may transmit at other frequencies using hardware and protocols deemed suitable by one skilled in the art.

In one embodiment, the transceiver 26 utilizes a long range mesh network using a spread spectrum modulation technique, such as a SEMTECH® LoRa® system or equivalent. In one embodiment, the pairing of the device 12 and the hub 10 is achieved automatically; however, in alternative embodiments, other steps may be required, as discussed below.

As shown in FIGS. 1-2, the network hub 10 includes a speaker 28 operably connected with (i.e., responsive to) the computer processor 22 or other component of the network hub 10. The speaker 28 may be any form of speaker or noise maker known in the art, and is used for providing alerts to the user. It may also be used for communicating with the user via audible commands and cues, e.g., to indicate that the network hub 10 has disconnected from a device within the alert system, or to indicate that the alert device has moved out of range of the transceiver. The network hub 10 may further include a battery indicator 30, a microphone 32, a power source 34, a communications port 36, and a pairing mechanism 38.

The battery indicator 30 visibly indicates the battery level, i.e., the amount of power left, in the alert device 12 (shown in FIG. 3) that is paired with the network hub 10. In this embodiment, the battery indicator 30 includes a plurality of lights (e.g., LEDs, or other known forms of light) which indicate the battery level by the number of lights that are illuminated. It may also make this indication via color, with green typically indicating a higher charge, yellow indicating a power level that his getting low, and red indicating that the battery level is approaching zero. In alternative embodiments now shown, the battery indicator 30 may be a small screen that displays a number (e.g., a percentage), and/or other form of symbol or color that indicates the battery power level. The speaker 28 may be used to provide an audible alert if the battery power of the alert device 12 is getting low.

Figure 3:
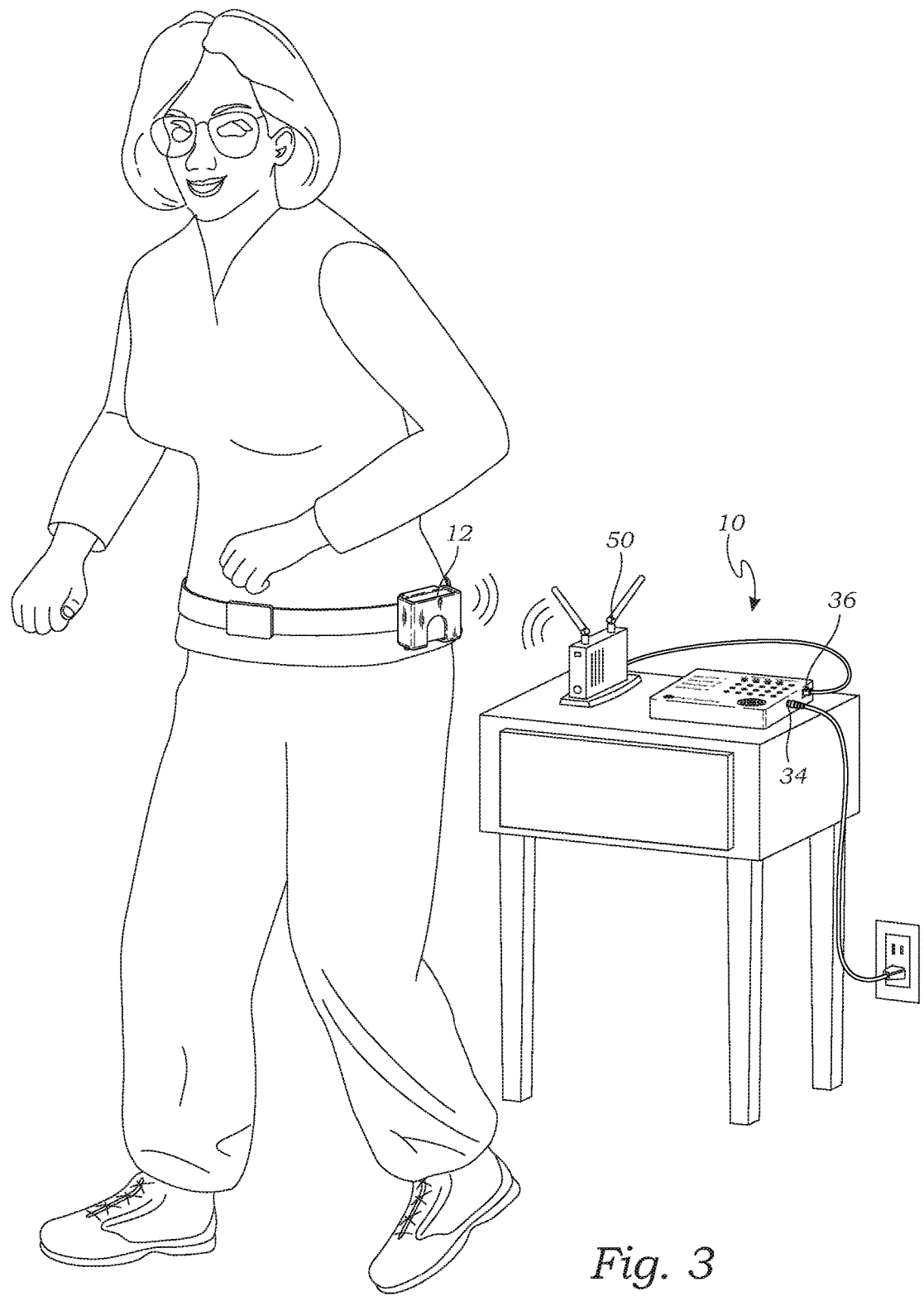
FIG. 3 is a perspective view of a person wearing an alert device operably paired with the network hub.

As shown in FIG. 1, multiple battery indicators 30 may be included (in this case, four), so that the network hub 10 may interact with multiple alert devices 12 (shown in FIG. 3). Obviously this is not required, or may accommodate other numbers of users. A commercial embodiment at a nursing home, for example, might track a large number of alert devices 12, with the battery level being indicated by a display screen (not shown), along with other pertinent information, such as user name, room, or bed number, etc.

In the embodiment of FIG. 1, the pairing mechanism 38 may be in the form of a button, though any other suitable mechanism (e.g., a switch, touch screen, etc.) can be used to the same effect. A user may pair the alert device 12 with the network hub 10 by actuating both the pairing mechanism 38 and a button (not shown) on the alert device 12 at the same time, while holding them in proximity to each other. Subsequent pairings will occur automatically when the alert device 12 is in range of the transceiver 26. This ensures minimal setup requirements for a user, for ease of use and to accommodate technological confusion that may arise for the elderly.

As shown in FIG. 2, the microphone 32 may be included to receive voice commands from the user; the power source 34 may be a connector for connecting with an AC outlet, or any form of power source (e.g., a battery) known in the art. The communications port 36 may be included to enable connection to a network, such as with an Ethernet cable connected to a router 50. These and other features may be included, along with other similar features that increase the capabilities of the network hub 10.

As shown in FIG. 2, the computer memory 24 stores executable code such as a management program 46 that, when executed, enables the network hub 10 to perform a process of operation that is described in greater detail below. The computer memory 24 may also include a database 48 for storing information about the user, caregivers associated with the user, and other information related to the processes described herein. Connected to the alert system via a computer network 52 is a web server 40, which also has a computer processor 42, a computer memory 44, a management program 46, and a database 48. The term "database" as used herein, refers to any form of one or more (or combination of) relational databases, object-oriented databases, hierarchical databases, network databases, non-relational (e.g. NoSQL) databases, document store databases, in-memory databases, programs, tables, files, lists, or any form of programming structure or structures that function to store data as described herein.

The network hub 10 periodically communicates with the web server 40, as seen in FIG. 2, to send confirmations at regular intervals that each connected device 12 is operably connected and the user is protected. In the event of a fall, such as a detected fall, or a user-activated alert due to illness, injury, home invasion robbery, etc., the device 12 is then able to use this operative connection to report the alert to the web server 40, so that notifications may be sent to caregivers such as parents, children, doctors, nurses, or other responsible parties. The device 12 may further check the web server 40 at regular intervals to ensure that firmware is updated, as well as run a device check for potential computer errors.

FIG. 3 is a perspective view of a person wearing one embodiment of an alert device 12 operably paired with the network hub 10. As shown in FIG. 3, in this embodiment, the alert device 12 is attached to the user's belt, although it may alternatively clipped to other parts of the user's clothing or body, or attached in other methods known in the art (e.g., worn on a wrist band, etc.). In this embodiment, the network hub 10 is connected to a router 50 for operably connecting the computer network 52 and the web server 40, as shown in FIG. 2.

The alert device 12 may be any form of electronic device known in the art for detecting alert conditions. For example, fall detection devices known in the art utilize accelerometers and similar electronics for detecting falls, which may result in the user being injured. Some devices 12 monitor vital signs for signs of injury or illness, which may be reported. Other devices 12 allow the user to press a button to summon help in the event of an emergency. Any such device known in the art may be used in the present invention. Since these types of devices are known in the art, they are not described in greater detail herein.

For purposes of this application, the terms "computer," "computer device," and "web server" as used herein refer to a device and/or system of devices that include at least one computer processing element, e.g., a central processing unit (CPU), and some form of computer memory having a capability to store data. The computer may include hardware, software, and/or firmware for receiving, storing, and/or processing data, as described below. For example, a computer may have any of a wide range of digital electronic devices, including, but not limited to, a server, a desktop computer, a laptop, a smart phone, a tablet, or any form of electronic device capable of functioning as described herein.

The term "computer network" may include any device or system for communicating information from one computer device to another. For example, a global computer network (e.g., the Internet) may be used, including any form of local area networks (LANs), wide area networks (WANs), or direct connections, such as through a universal serial bus (USB) port, other forms of computer-readable media, or any combination thereof. On an interconnected set of LANs, including those based on differing architectures and protocols, a router 50 may act as a link between LANs, enabling messages to be sent from one to another. In addition, communication links within LANs typically include a twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), and wireless links, including satellite links, or other communications links known to those skilled in the art. The network may further include any form of wireless network, including cellular systems, WLAN, Wireless Router (WR) mesh, or the like. Access technologies such as 2G, 3G, 4G, and future access networks may enable wide area coverage for mobile devices. In essence, the wireless network may include any wireless communication mechanism known in the art by which information may travel between computers of the present system.

Figure 4:
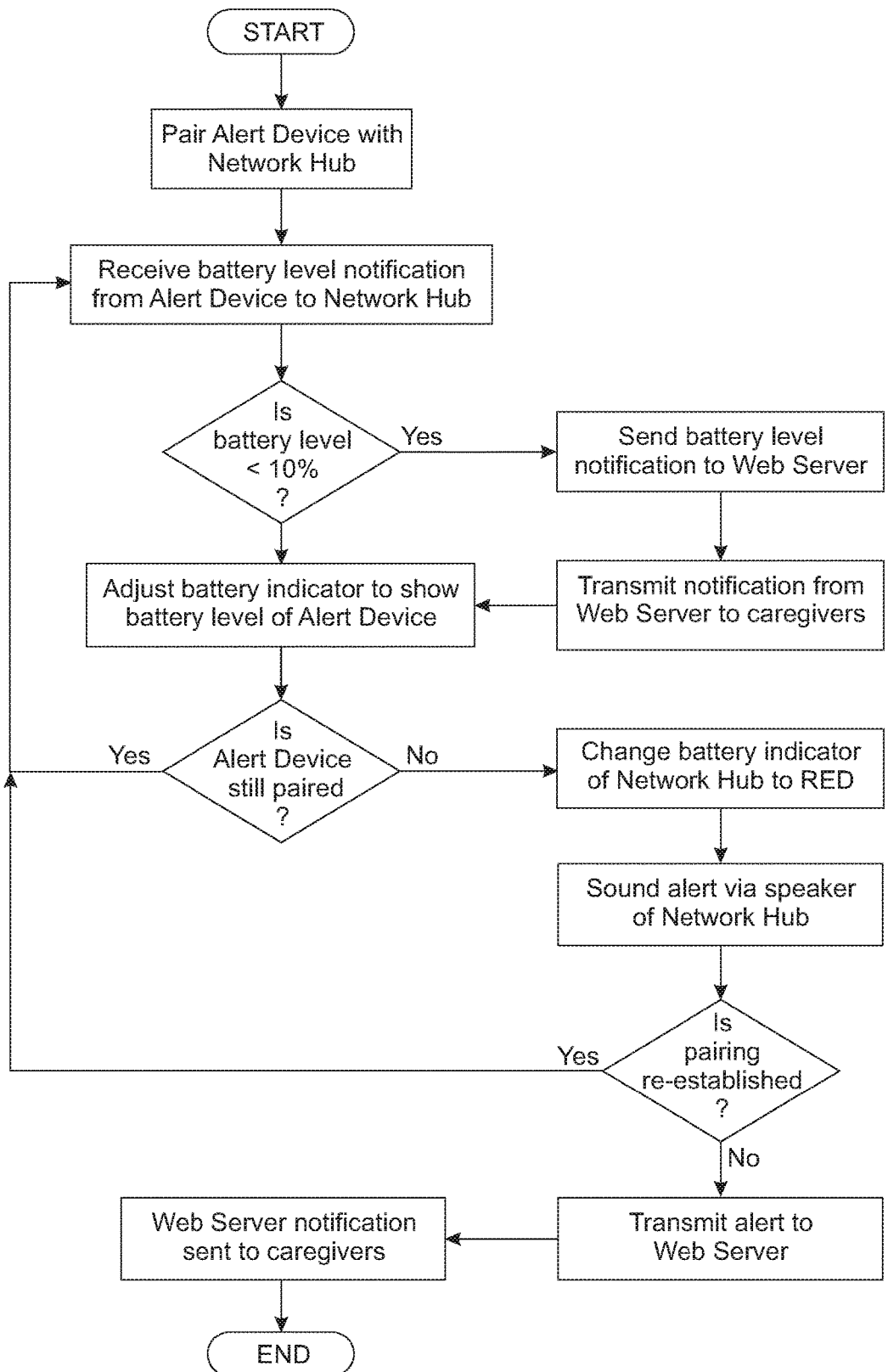
FIG. 4 is a flow diagram illustrating the operation of the network hub of FIG. 1.

FIG. 4 is a flow diagram illustrating the operation of the network hub 10 of FIG. 1. As shown in FIGS. 1-4, the alert device 12 (shown in FIGS. 2-3) may be paired with the network hub 10 via the pairing mechanism 38 and the transceiver 26 for wireless communication. In alternative embodiments, such pairing may be performed automatically once the device 12 comes within range of the hub 10, or using other methods known in the art. Especially in long range embodiments, such as using LoRa® or equivalent technology, multiple devices 12 may come into and out of coverage of a wide range of hubs 10, and any available hub 10 may be used for reporting an emergency.

In this embodiment, the alert device 12 may send periodic battery level notifications to the network hub 10, to indicate the battery level. These notifications are received in the hub 10, and used to adjust the battery level indicator 30 (shown in FIG. 1). This may also indicate whether the battery level has fallen below a predetermined minimum threshold. In the case of having fallen below the threshold, the network hub 10 may then send a notification to the web server 40, which transmits an alert to the user's caregivers that the battery level is too low. In either case, once the battery indicator 30 is adjusted to display the updated battery level, and if the alert device 12 is still paired with the network hub 10, the cycle repeats as described. The battery indicator 30 includes a plurality of lights, and the color of the lights changes to indicate whether the alert device 12 in paired with the network hub 10.

In some embodiments, the hub 10 may send an alert of some sort in the event that the device 12 moves out of range of the hub 10. For example, the hub 10 (and/or the device 12) may emit an audible tone in the event of loss of coverage. Or, alternatively, a visual indicator such as a light may be illuminated to indicate loss of connection, or a text of other form of notification may be sent to the user and/or one or more of the caregivers. In this embodiment, if the alert device 12 becomes disconnected from the network hub 10, the battery indicator 30 will change to a red color and send an audio alert via the speaker 28. If the pairing is reestablished, the cycle will repeat as described. If the pairing is not reestablished, the network hub 10 will transmit an alert to the web server 40, which then sends a notification to the caregivers that the alert device 12 is not connected. The web server 40 may transmit alerts via text messages, audio notifications, or any other communication known to those skilled in the art.

As used in this application, the words "a," "an," and "one" are defined to include one or more of the referenced item unless specifically stated otherwise. The terms "approximately" and "about" are defined to mean +/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. A network hub for communicating with an alert device of a user for receiving electronic alerts from the user, the network hub comprising:

a housing that contains a computer processor and a computer memory operably connected to a transceiver for communicating with the plurality of alert devices; a speaker operably connected to the computer processor;

wherein the computer memory stores executable code that, when executed, enables the network hub to perform a process that comprises the steps of:

pairing one of the alert devices with the network hub via the transceiver for wireless communication;

receiving data periodically from the alert device paired with the network hub, which may include the alert if the user requires assistance;

determining if the alert device loses wireless communication with the network hub; and sounding an audible alert from the speaker of the network hub to alert the user that the alert device has lost communication with the network hub;

wherein the network hub further comprises a battery indicator that visibly indicates the battery level of the alert device, the battery indicator includes a plurality of lights, and the color of the lights changes to indicate whether the alert device in paired with the network hub.

2. The network hub of claim 1, wherein the executable code of the network hub performs the following steps:

receiving periodically a battery level notification from the alert device indicative of the battery level of the alert device;

adjusting the battery indicator to indicate the battery level of the alert device.

3. The network hub of claim 2, further comprising the steps of:

determining periodically if the battery level of the alert device has fallen below a predetermined minimum threshold; and transmitting an alert in the event that the battery level of the alert device has fallen below the minimum threshold.

4. The network hub of claim 3, wherein the network hub transmits the alert to a web server, which in turn transmits the alert to a caregiver to alert the caregiver that the battery level has fallen below the minimum threshold.

5. The network hub of claim 4, wherein the web server transmits the alert to the caregiver via text message.

6. A network hub for communicating with an alert device of a user for receiving electronic alerts from the user, the network hub comprising:

a housing that contains a computer processor and a computer memory operably connected to a transceiver for communicating with the plurality of alert devices;

a speaker operably connected to the computer processor;

a battery indicator comprises a plurality of lights mounted on the housing that visibly indicates the battery level of the alert device;

wherein the computer memory stores executable code that, when executed, enables the network hub to perform a process that comprises the steps of:

pairing one of the alert devices with the network hub via the transceiver for wireless communication;

receiving data periodically from the alert device paired with the network hub, which may include the alert if the user requires assistance;

determining if the alert device loses wireless communication with the network hub; and visibly changing color of the plurality of lights of the battery indicator to alert the user that the alert device has lost communication with the network hub.

7. The network hub of claim 6, wherein herein the executable code of the network hub performs the following steps:

receiving periodically a battery level notification from the alert device indicative of the battery level of the alert device;

adjusting the battery indicator to indicate the battery level of the alert device.

8. The network hub of claim 7, further comprising the steps of:

determining periodically if the battery level of the alert device has fallen below a predetermined minimum threshold; and transmitting an alert in the event that the battery level of the alert device has fallen below the minimum threshold.

9. The network hub of claim 8, wherein the network hub transmits the alert to a web server, which in turn transmits the alert to a caregiver to alert the caregiver that the battery level has fallen below the minimum threshold.

* * * * *